(12) United States Patent
Liu et al.

(10) Patent No.: US 10,503,311 B2
(45) Date of Patent: Dec. 10, 2019

(54) SYSTEM AND METHOD FOR REGULATING VOLTAGES IN A DISPLAY DEVICE HAVING AN INTEGRATED SENSING DEVICE

(71) Applicant: SYNAPTICS INCORPORATED, San Jose, CA (US)

(72) Inventors: Chunbo Liu, San Jose, CA (US); Koji Kishi, Sunnyvale, CA (US); Zheming Li, San Jose, CA (US); Wenwei Yang, Sunnyvale, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 110 days.

(21) Appl. No.: 15/865,785

(22) Filed: Jan. 9, 2018

(65) Prior Publication Data

US 2019/0121483 A1    Apr. 25, 2019

Related U.S. Application Data

(63) Continuation-in-part of application No. 15/792,324, filed on Oct. 24, 2017, now abandoned.

(51) Int. Cl.
*G06F 3/041* (2006.01)
*G06F 3/044* (2006.01)
*H02M 3/07* (2006.01)

(52) U.S. Cl.
CPC ............ *G06F 3/0416* (2013.01); *G06F 3/044* (2013.01); *H02M 3/07* (2013.01)

(58) Field of Classification Search
CPC ....................................................... H02M 3/07
See application file for complete search history.

(56) References Cited

U.S. PATENT DOCUMENTS

| | | | |
|---|---|---|---|
| 2006/0284864 A1* | 12/2006 | Woo | G09G 3/00 345/211 |
| 2015/0098255 A1* | 4/2015 | Nate | H02M 1/36 363/21.16 |
| 2015/0109161 A1* | 4/2015 | Trampitsch | H03K 17/063 341/172 |
| 2017/0271987 A1* | 9/2017 | Yu | H02M 3/1582 |
| 2018/0183338 A1* | 6/2018 | Fukushima | H02M 3/156 |

* cited by examiner

*Primary Examiner* — Jue Zhang
*Assistant Examiner* — Trinh Q Dang
(74) *Attorney, Agent, or Firm* — Patterson + Sheridan, LLP

(57) ABSTRACT

Embodiments herein provide a voltage regulation system comprising a charge pump a voltage regulator and a current regulator. The charge pump is configured to output a current signal to a capacitor. The voltage regulator is configured to sample an output of the capacitor, and compare the sampled voltage to a target voltage to generate a control signal. The current regulator is configured to sample a portion of the output current based on the control signal and regulate the current signal outputted by the charge pump.

18 Claims, 10 Drawing Sheets

SYSTEM AND METHOD FOR REGULATING VOLTAGES IN A DISPLAY DEVICE HAVING AN INTEGRATED SENSING DEVICE

CROSS-REFERENCE TO RELATED APPLICATIONS

This application is a continuation-in-part of U.S. patent application Ser. No. 15/792,324, filed Oct. 24, 2017, which is incorporated by reference in its entirety.

FIELD

The following disclosure generally relates to electronic devices and regulating gate voltages within a display device having an integrated sensing device.

BACKGROUND

Input devices including a display device having an integrated sensing device are widely used in a variety of electronic systems. The display device and integrated sensing device typically share one or more elements reducing the number of overall elements needed. However, in various instances, there may be the need to monitor and adjust one or more operating parameters of the display device to account for system wide changes caused when integrating the sensing device within the display device. For example, display artifacts may appear during long pauses in display updated during which input sensing occurs.

BRIEF SUMMARY

In one embodiment, a voltage regulation system comprises a charge pump, a voltage regulator, and a current regulator. The charge pump is configured to output a current signal to a capacitor, and the capacitor is modulated producing a modulated voltage signal. The voltage regulator is coupled to an output of the capacitor and is configured to sample the modulated voltage signal generating a sampled voltage, compare the sampled voltage to a target voltage, and generate a first control signal based on the comparison. The current regulator is coupled to the voltage regulator and the charge pump, the current regulator is configured to regulate the current signal based at least in part on the first control signal.

In another embodiment, a display driver for a display device comprises a capacitor, a voltage regulation system, a charge pump, a voltage regulator, and a current regulator. The capacitor is configured to be coupled to at least one gate line of the display device. Further, the capacitor is modulated outputting a modulated voltage signal. The voltage regulation system is coupled to the output of the capacitor and comprises a charge pump, a voltage regulator and a current regulator. The charge pump is configured to output a current signal to the capacitor. The voltage regulator is configured to sample the modulated voltage signal generating a sampled voltage, compare the sampled voltage to a target voltage, and generate a first control signal based on the comparison. The current regulator is coupled to the voltage regulator and the charge pump and is configured to regulate the current signal based at least in part on the first control signal.

In another embodiment, a method for regulating a voltage for a display driver comprises sampling a modulated voltage to generate a sampled voltage, comparing the sampled voltage to a target voltage to determine if the sampled voltage is one of greater than and less than the target voltage, and regulating the current signal based on a determination that the sampled voltage is less than the target voltage. The output of a capacitor is modulated to produce the modulated voltage, where the capacitor is driven by a current signal of a charge pump.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
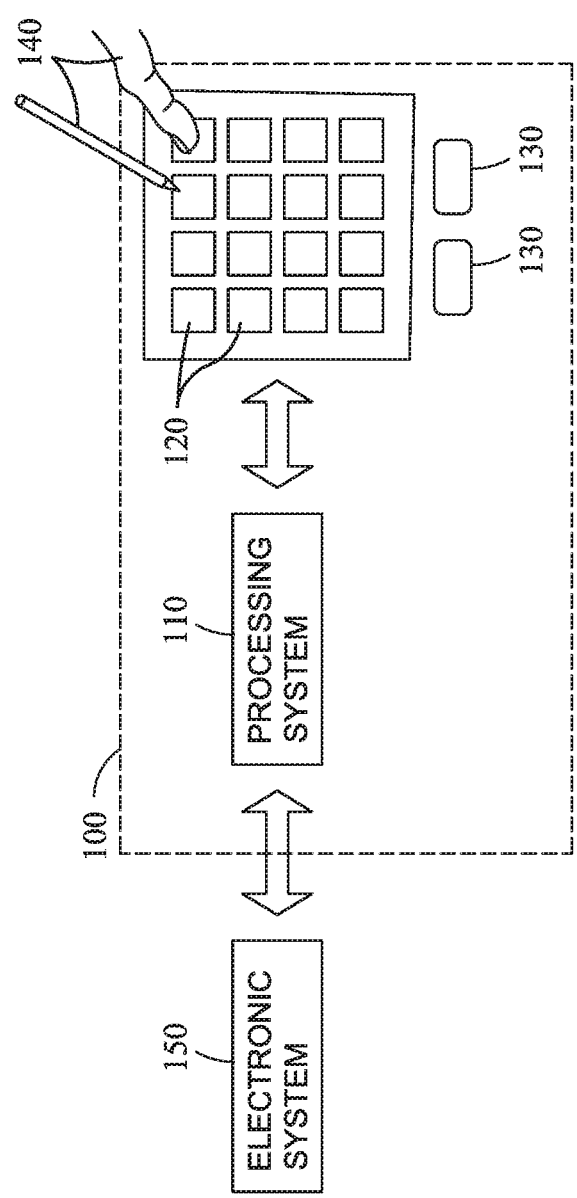
FIG. 1 is a block diagram of an exemplary system that includes an input device in accordance with an embodiment of this disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments of the present technology provide display devices and methods for reducing artifacts within display devices. Particularly, embodiments described herein advantageously provide techniques for reducing voltage reductions (voltage droop) within a display device during a pause in display updating. Through sampling of display voltages, display capacitors may be driven in such a way to at least reduce any reduction in voltage provided at the output of the capacitor.

Turning now to the figures, FIG. 1 is a schematic block diagram of an input device 100 in accordance with embodiments of the present technology. In one embodiment, input device 100 comprises a display device having an integrated sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system. As appropriate, the input device 100 may communicate with parts of the electronic system 150 using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region. Example input objects 140 include fingers and styli, as shown in FIG. 1.

In various embodiments, the input device 100 is configured as a capacitive sensing device. Some capacitive implementations utilize arrays or other regular or irregular patterns of capacitive sensing elements 120 to create electric fields. In some capacitive implementations, separate sensing elements 120 may be ohmically shorted together to form larger sensor electrodes.

The input device 100 may utilize any combination of sensor components and sensing technologies to detect user input in a sensing region of the input device. The input device 100 comprises a plurality of sensing elements 120 for detecting user input. The sensing elements 120 may form a plurality of sensor electrodes.

In some capacitive implementations of the input device 100, voltage or current is applied to one or more sensor electrodes to create an electric field. Nearby input objects 140 cause changes in the electric field, and produce detectable changes in capacitive coupling that may be detected as changes in voltage, current, or the like by one or more sensor electrodes.

Some implementations are configured to provide images that span one, two, three, or higher dimensional spaces. Some implementations are configured to provide projections of input along particular axes or planes.

In FIG. 1, the processing system 110 is shown as part of the input device 100. The processing system 110 is configured to operate the hardware of the input device 100 to detect input in the sensing region. In various embodiments, the processing system 110 is additionally configured to operate the hardware of the input device 100 to update a display of a display device. The processing system 110 comprises parts of or all of one or more integrated circuits (ICs) and/or other circuitry components. For example, a processing system for a capacitance sensor device comprises one more of driver circuitry configured to drive signals onto, and/or receiver circuitry configured to receive signals from one or more sensor electrodes. A processing system may additionally or alternatively include display driver circuitry configured to drive one or more display electrodes (e.g., gate lines (display lines), source lines and/or common electrodes) for display updating. In some embodiments, the processing system 110 also comprises electronically-readable instructions, such as firmware code, software code, and/or the like.

In some embodiments, the processing system 110 operates the sensing electrodes of the input device 100 to produce electrical signals indicative of input (or lack of input) in the sensing region. The processing system 110 may perform any appropriate amount of processing on the electrical signals in producing the information provided to the electronic system. For example, the processing system 110 may digitize analog electrical signals obtained from one or more sensor electrodes. As another example, the processing system 110 may perform filtering, demodulation or other signal conditioning. In various embodiments, the processing system 110 generates a capacitive image directly from the resulting signals received with sensor electrodes. In other embodiments, processing system 110 spatially filters (e.g., taking a difference, weighted sum of neighboring elements) the resulting signals received with sensor electrodes to generate a sharpened or averaged image. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region, or some other functionality. FIG. 1 shows buttons 130 near the sensing region that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region overlaps at least part of an active area of a display screen of a display device. For example, the input device 100 may comprise substantially transparent sensing sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. In various embodiments, a sensing device and the display device share physical elements. For example, some embodiments may utilize some of the same electrical components for displaying and sensing (e.g., the active matrix control electrodes configured to control the source, gate and/or Vcom voltages (common voltage electrode voltages)). Shared components may include display electrodes, substrates, connectors and/or connections. As another example, the display device may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
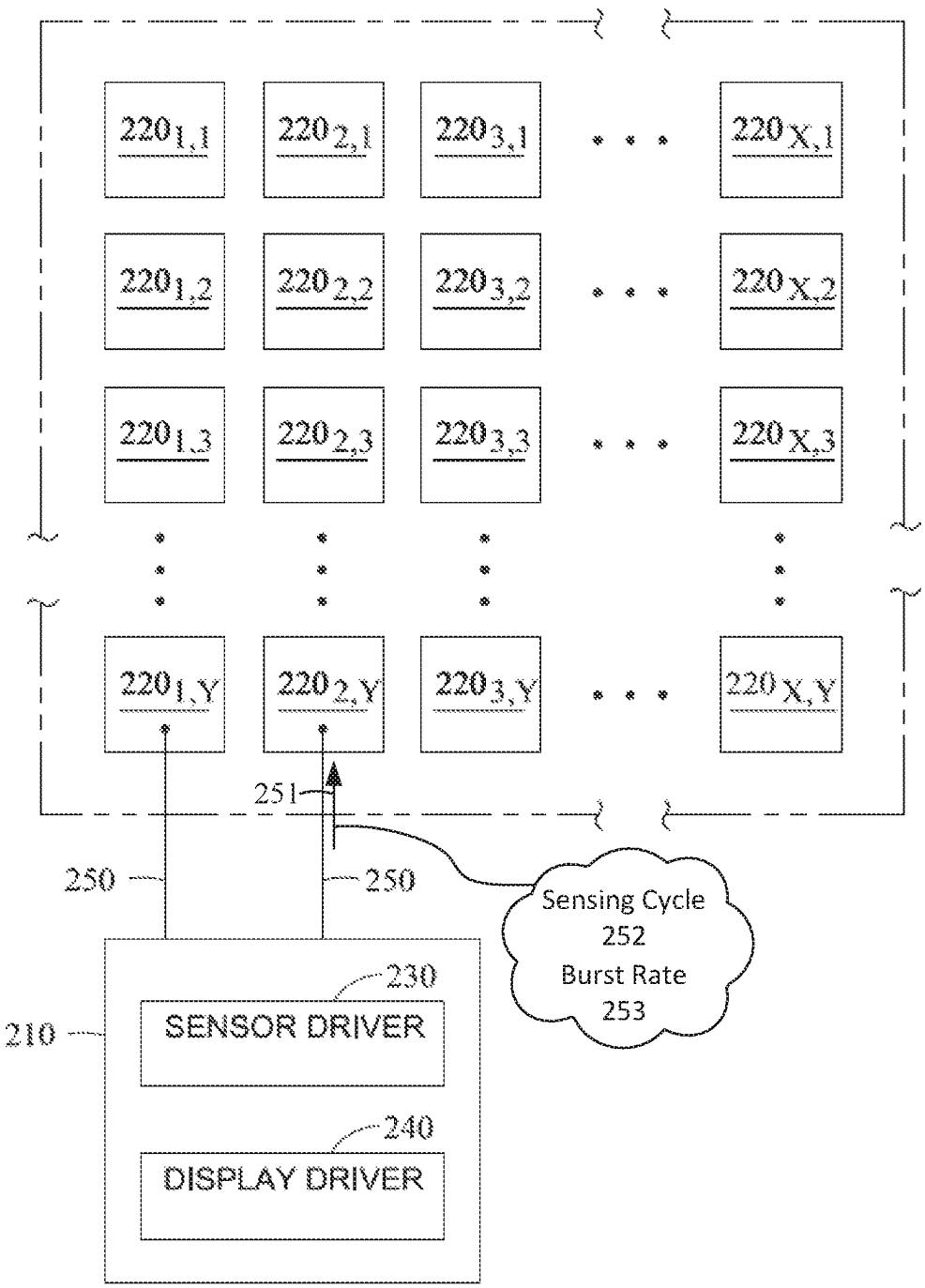
FIG. 2 is shows a portion of an exemplary pattern of capacitive sensing electrodes, in accordance with an embodiment of this disclosure.

FIG. 2 shows a portion of an exemplary pattern of sensing electrodes 220 configured to sense in a sensing region. For clarity of illustration and description, FIG. 2 shows the sensor electrodes 220 in a pattern of simple rectangles, and does not show various other components. The exemplary pattern of sensor electrodes 220 comprises an matrix of sensor electrodes $220_{X,Y}$ arranged in X columns and Y rows, wherein X and Y are positive integers, although one of X and Y may be zero. In one example, each column includes at least two sensor electrodes 220 and each row includes at least two sensor electrodes 220. It is contemplated that the pattern of sensor electrodes 220 may have other configurations, such as polar arrays, repeating patters, non-repeating patterns, a single row or column, or other suitable arrangement. Further, in various embodiments the number of sensor electrodes may vary from row to row and/or column to column. In one embodiment, at least one row and/or column of sensor electrodes 220 is offset from the others, such it extends further in at least one direction than the others. The sensor electrodes 220 are coupled to the processing system 110 and utilized to determine the presence (or lack thereof) of an input object in the sensing region.

In various embodiments, the arrangement of sensor electrodes 220 (220-1, 220-2, 220-3, . . . 220-n) may be utilized to detect the presence of an input object via absolute sensing techniques. That is, processing system 210 is configured to modulate sensor electrodes 220 to acquire measurements of changes in capacitive coupling between the modulated sensor electrodes 220 and an input object to determine the position of an input object. Absolute capacitance (or self-capacitance) sensing techniques determine changes in the capacitive coupling between driven sensor electrodes 220 and an input object. In various embodiments, an input object near the sensor electrodes 220 alters the electric field near the sensor electrodes 220, thus changing the measured capacitive coupling. In one implementation, an absolute capacitance sensing method operates by modulating sensor electrodes 220 with respect to a reference voltage, and by detecting the capacitive coupling between the sensor electrodes 220 and one or more input objects. In various embodiments, the processing system 210 is configured to determine changes of absolute capacitance based on a measurement of resulting signals received with one or more sensor electrodes 220 which are modulated.

In one or more embodiments, the sensor electrodes 220 (220-1, 220-2, 220-3, . . . 220-n) may be utilized to detect the presence of an input object via transcapacitive sensing techniques when processing system 210 drives a transmitter signal onto a first sensor electrode and receives with a second sensor electrode. That is, processing system 210 is configured drive a first one or more sensor electrodes with a transmitter signal and receive resulting signals with a second one or more sensor electrodes, where a resulting signal (or signals) comprises effects corresponding to the transmitter signal. The resulting signal (or signals) is utilized by the processing system 210 or other processor to determine positional information of one or more input objects. Transcapacitance (mutual-capacitive) sensing methods are based on changes in the capacitive coupling between sensor electrodes 220. In various embodiments, an input object near the sensor electrodes 220 alters the electric field between the sensor electrodes 220, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage to transmit a transmitter signals. Receiver sensor electrodes may be held substantially constant relative to the reference voltage to facilitate receipt of resulting signals. Sensor electrodes 220 may be dedicated transmitter electrodes or receiver electrodes, or may be configured to both transmit and receive.

The sensor electrodes 220 are typically ohmically isolated from each other. That is, one or more insulators separate the sensor electrodes 220 (and prevent them from electrically shorting to each other. In some embodiments, the sensor electrodes 220 are separated by an insulative gap. The insulative gap separating sensor electrodes 220 may be filled with an electrically insulating material, or may be an air gap. In some embodiments, the sensor electrodes 220 are vertically separated by one or more layers of insulative material. In some other embodiments, the sensor electrodes 220 are separated by one or more substrates; for example, one or more sensor electrodes may be disposed on opposite sides of the same substrate, or on different substrates.

In one or more embodiments, the processing system 210 includes a sensor driver 230 configured to operate the sensor electrodes 220 for capacitive sensing. Further, the processing system 210 may also or alternatively include a display driver 240 configured to update a display of a display device. The sensor driver 230 may include circuitry configured to drive at least one of the sensor electrodes 220 for capacitive sensing during input sensing periods. In one embodiment, the sensor driver 230 is configured to drive a modulated signal onto the at least one sensor electrode 220 to detect changes in absolute capacitance between the at least one sensor electrode 220 and an input object. In another embodiment, the sensor driver 230 is configured to drive a transmitter signal onto at least one sensor electrode 220 to detect changes in a transcapacitance between the at least one sensor electrode 220 and another sensor electrode 220. The modulated and transmitter signals are generally varying voltage signals comprising a plurality of voltage transitions over a period of time allocated for input sensing. In various embodiments, the sensor electrodes 220 may be driven differently in different modes of operation. In one embodiment, the sensor electrodes may be driven with signals (modulated signals, transmitter signals and/or shield signals) that may differ in any one of phase, amplitude and/or shape.

The display driver 240 may be included in or separate from the processing system 110. The display driver 240 includes circuitry confirmed to provide display image update information to the display of the display device during display updating periods. In one embodiment, the sensor driver 230, and the display driver 240 may be comprised within a common integrated circuit (first controller). In another embodiment, the sensor driver 230, and the display driver 240 may be comprised within separate integrated circuits (first and second controller). In those embodiments comprising multiple integrated circuits, a synchronization mechanism may be coupled between them, configured to synchronize display updating periods, sensing periods, transmitter signals, display update signals and the like.

In various embodiments, the sensor driver 230 includes circuitry configured to receive resulting signals with the sensing electrodes 220 comprising effects corresponding to the modulated signals or the transmitter signals during periods in which input sensing is desired. The sensor driver 230 may determine a position of an input object in the sensing region or may provide information indicative of the resulting signal to another module or processor, for example, a position determiner or a processor of the electronic system 150 (i.e., a host processor), for determining the position of the input object in the sensing region.

As discussed above, the sensor electrodes may be formed as discrete geometric forms, polygons, bars, pads, lines or other shape, which are ohmically isolated from one another. In various embodiments, ohmically isolated comprises passively isolated, where active switches may be configured to couple different sensor electrodes to the same signal during a period of time. The sensor electrodes may be electrically coupled through circuitry to form electrodes of having larger plan area relative to a discrete one of the sensor electrodes. The sensor electrodes may be fabricated from opaque or non-opaque conductive materials, or the combination of the two. In embodiments wherein the sensor electrodes are utilized with a display device, it may be desirable to utilize non-opaque conductive materials for the sensor electrodes. In embodiments wherein the sensor electrodes are not utilized with a display device, it may be desirable to utilize opaque conductive materials having lower resistivity for the sensor electrodes to improve sensor performance. Materials suitable for fabricating the sensor electrodes include ITO, aluminum, silver, copper, molybdenum and conductive carbon materials, among others and various sensor electrodes may be formed of a deposited stack of different conductive materials. The sensor electrodes may be formed as contiguous body of conductive material having little or no open area (i.e., having a planar surface uninterrupted by holes), or may alternatively be fabricated to form a body of material having openings formed therethrough.

Figure 3:
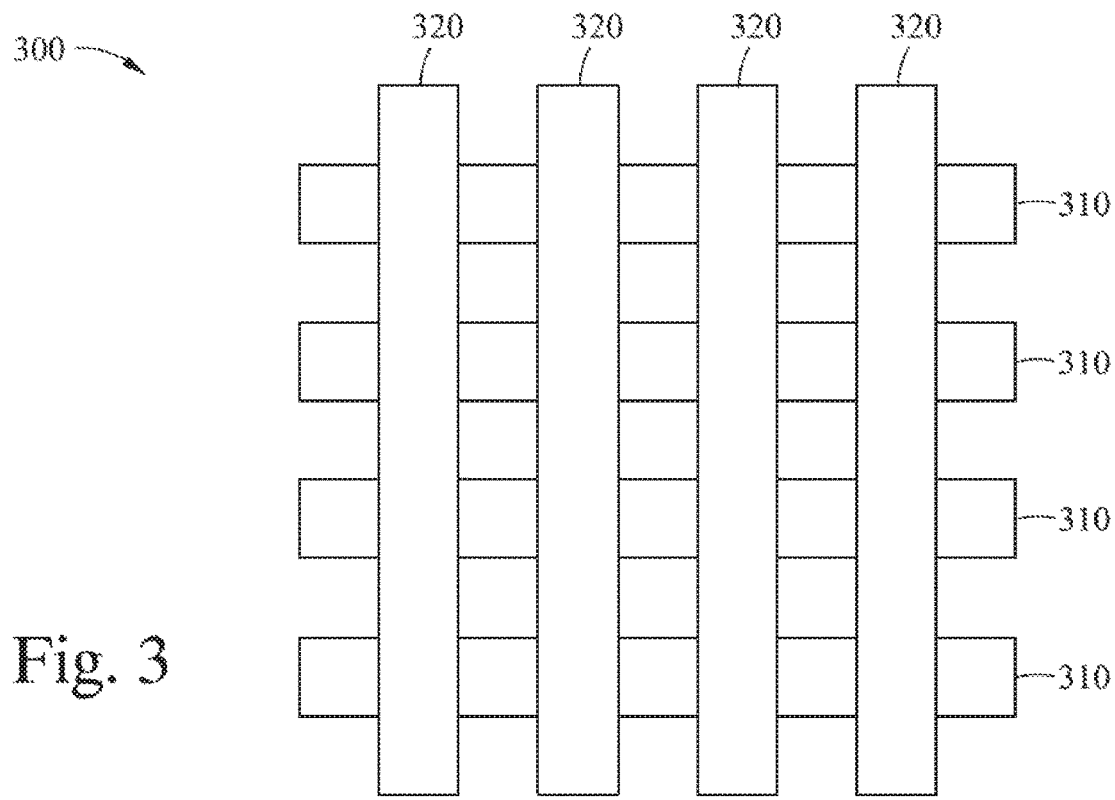
FIG. 3 is shows a portion of an exemplary pattern of capacitive sensing electrodes, in accordance with an embodiment of this disclosure.

The conductive routing traces 250 may be formed in the same plane at least one of the sensor electrodes 220, or may be formed on one or more separate substrates and connected to the respective electrodes 220 by vias (not shown). Conductive routing traces 250 may be formed on a metal layer disposed such that the sensor electrodes 220 are between the metal layer and the input object. In one embodiment the metal layer comprises source driver lines and/or gate lines for a display device. The conductive routing traces 250 and vias between them may be obscured from a user by a black mask layer disposed between them and the user of the display device. At least one of the conductive routing traces 250 may comprise one or more routing traces (conductors) in the source driver metal layer. In one or more embodiments such a layer may be referred to as metal interconnect layer two. Further, conductive routing traces 250 may be disposed on a metal layer between source driver lines. Alternately, at least one of the conductive routing traces 250 may comprise one or more conductors in the gate driver metal layer or gate driver lines not configured for display updating. Further, conductive routing traces 250 may be disposed on a metal layer between gate driver lines. In another embodiment, at least one of the conductive routing traces 250 may comprise one or more conductors in the Vcom jumper metal layer or Vcom lines not otherwise configured for display updating. Further, conductive routing traces 250 may be disposed on a metal layer between gate electrodes. In other embodiments the metal layer is included in addition to a layer comprising the source driver lines and/or gate lines. A portion of the conductive traces 250 may also be formed laterally outward of the areal bounds of the sensor electrodes 220. In various embodiments, the conductive routing traces 250 may be disposed in a Vcom electrode jumper layer. The Vcom electrode jumper layer may be referred to as metal layer three or a metal interconnect layer three. In one embodiment, conductive traces may be disposed on both a source drive layer and a Vcom electrode jumper layer. In various embodiments, the display device may comprise a "dual gate" or "half source driver" configuration, allowing conductive routing traces 250 to be disposed between source drivers on the source driver layer. In one or more embodiments, orthogonal directions of connections between the conductive routing traces 250 they may be place on separate layers with vias between them FIG. 3 illustrates input device 300, having sensor electrodes 310 and 320. In one embodiment, sensor electrodes 310 may be operated as transmitter electrodes and sensor electrodes 320 may be operated as receive electrodes for transcapacitive sensing. In another embodiment, the sensor electrodes 310 and sensor electrodes 320 may be operated for absolute capacitive sensing. In various embodiments, the sensor electrodes 310 and 320 may be substantially rectangular in shape. In other embodiments, the sensor electrodes may have other shapes. Further, each of the sensor electrodes, 310 and/or 320 may have the same shape and/or size. In other embodiments, at least one sensor electrode may have a different shape and/or size than another sensor electrode. In various embodiments, one or more sensor electrodes include at least one extension. The sensor electrodes 310 and 320 may be disposed on the same layer or on separate layers. In one embodiment, the sensor electrodes 310 may be disposed on a first substrate and the sensor electrodes 320 may be disposed on a second substrate.

As illustrated the sensor electrodes 310 and 320 may span across at least a portion of the sensing region. In one embodiment, each sensor electrode of sensor electrodes 310 and 320 spans the entire distance across the sensing region.

The areas of localized capacitive sensing of capacitive couplings may be termed "capacitive pixels." Capacitive pixels may be formed between an individual sensor electrode and a reference voltage in embodiments employing absolute capacitive sensing methods and between and between groups of sensor electrodes used as transmitter and receiver electrodes in embodiments employing transcapacitive sensing methods.

A set of measurements between sensor electrodes or between sensor electrodes and an input object from the capacitive pixels of a "capacitive image" (also "capacitive frame"). Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some input device embodiments, one or more of the sensor electrodes comprise one or more display electrodes used in updating the display of the display screen. The display electrodes may comprise one or more elements of the Active Matrix display such as one or more segments of a segmented Vcom electrode (common electrode(s)), a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc.

In various embodiments, each of the sensor electrodes comprises one or more common electrodes (e.g., segments of a segmented Vcom electrode). In other embodiments, at least two sensor electrodes may share at least one common electrode. While the following description may describe that sensor electrodes comprise one or more common electrodes, various other display electrodes as describe above may also be used in conjunction with the common electrode or as an alternative to the common electrodes. In various embodiments, the sensor electrodes comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

In one or more embodiments, capacitive sensing (or input sensing) and display updating may occur during at least partially overlapping periods. For example, as a common electrode is driven for display updating, the common electrode (and corresponding sensor electrode(s)) may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period, where the blanking period occurs between two display updating periods and is at least as long as a display line update period. In one embodiment, the non-display update period occurs between display line update periods of a frame and is long enough to allow for multiple transitions of the transmitter signal to be driven onto the sensor electrodes. In other embodiments, the non-display update period may comprise horizontal blanking periods and vertical blanking periods.

In various embodiments, a large amount of background capacitance (parasitic capacitance) may exist between the sensor electrodes and display electrodes (e.g., gate lines, sources lines and/or common electrode). Background capacitance exists when the sensor electrodes are held at a different voltage potential from proximate display electrodes. With potentially hundreds or thousands gate lines and source lines, the amount of background capacitance can be relatively large as the gate lines and source lines are typically held at a constant voltage, and in many instances, they are at a different potential than the sensor electrodes. Those differences cause the above-mentioned background capacitance. In various embodiments, background capacitance negatively affects the sensitivity of an input device to changes in capacitance caused by an input object. Further, background capacitance may limit the available sensing frequencies of the capacitive sensing signals that may be used. For example, higher background capacitances may increase the RC time constant of the input device, limiting the number of higher sensing frequencies that may be implemented. As such, less sensing frequencies may be available for interference avoidance techniques and/or the capacitive frame rate may be decreased. In one or more embodiments, the difference in voltage may be eliminated or at least substantially reduced by driving the gate lines and/or the source lines with a guard signal that is at least similar in at least one of amplitude, frequency and phase. In one embodiment, a guard signal that is similar to the modulation signal driven onto the sensor electrode for capacitive sensing is driven onto the gate lines and/or source lines. In one or more embodiments, a guard signal may be referred to as modulated shield signal.

Figure 4:
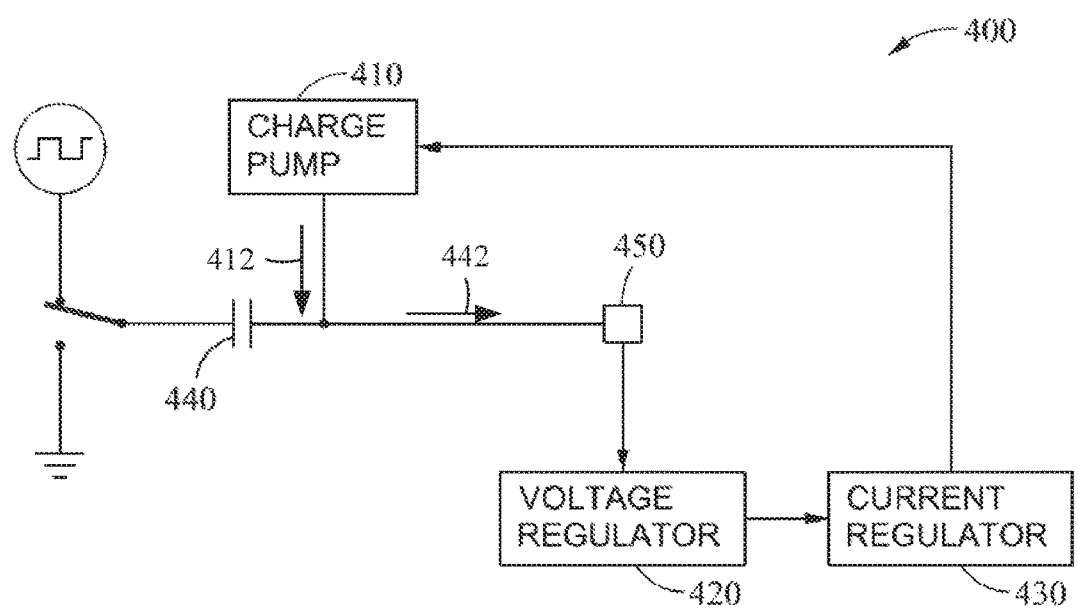
FIG. 4 is a block diagram of an exemplary voltage regulation system in accordance with an embodiment of this disclosure.

FIG. 4 illustrates a voltage regulation system 400 including charge pump 410, voltage regulator 420, and current regulator 430 coupled to capacitor 440. The charge pump 410 is configured to drive the capacitor 440 with a current signal (e.g., a current signal 412). The voltage regulator 420 is coupled to output node 450 of the capacitor 440 and is configured to sample the output voltage of the capacitor 440. In various embodiments, the output of the capacitor 440 is a modulated voltage (e.g., modulated voltage signal 442). Further, the voltage regulator 420 generates a control signal based on a comparison of the sampled voltage and a target voltage. The current regulator 430 is coupled to the charge pump 410 and is configured to regulate the current signal output by the charge pump 410 based on the control signal.

The voltage regulator 420 and the current regulator 430 together regulate the output current provided by the charge pump 410 to capacitor 440. In one or more embodiment, the current regulator 430 is configured to sample a portion of the total current output by the charge pump 410 and compare the sampled current to current thresholds to determine whether or not the output current of the charge pump 410 should be increased or decreased. In one or more embodiments, as the sampled voltage ($V_{sample}$) is regulated to the target voltage ($V_{target}$) and a regulator current ($I_{reg}$) is regulated. $I_{reg}$ is sampled by the current regulator 430 and compared to thresholds to determine whether or not the output current of charge pump 410 is adjusted. $I_{reg}$ corresponds to the wasted current of total current ($I_{total}$) provided by the charge pump.

In various embodiments, voltage regulation system 400 is a voltage regulation system for a display device having a display panel. As is described above, the display device may include a plurality of gate lines, a plurality of source lines and common electrode (or electrodes). Each of the plurality of gate lines is coupled to plurality of pixels and control the state of the pixels and may alternatively be referred to as a display line. For example, each gate line may be coupled to the gate of a transistor within each pixel, and depending on the voltage driven onto the gate line; the pixels may be turned on or turned off. In one embodiment, when a gate line is driven with a gate high voltage signal ($V_{GH}$) the corresponding plurality of pixels are turned on (selected) such that when the source lines are driven, the selected pixels are updated. In another embodiment, when a gate line is driven with a low gate voltage signal ($V_{GL}$) the corresponding pixels are turned off (de-selected).

In various embodiments, each pixel of the plurality of pixels includes an electrode (pixel electrode), which is driven to a corresponding voltage level by a source line. Further, a common voltage electrode may be driven to a common voltage and the difference between the pixel electrode voltage and the common voltage controls a property of a liquid crystal material. In one embodiment, the common electrode and the pixel electrodes may be vertically aligned such that the common electrode is disposed above the pixel electrodes and the liquid crystal material is disposed between the common electrode and the pixel electrodes. In other embodiments, the common electrode and the pixel electrodes may be disposed along a common plane, where the liquid crystal material is placed above both of the common electrode and the pixel electrodes. Further, each pixel may include one or more storage capacitors which are charged by the source lines.

In other embodiments, instead of each pixel electrode being separated from a common electrode via a liquid crystal material, each pixel electrode is part of an array of organic light emitting diodes (OLED), where each pixel electrode is offset by a common electrode, the pixel electrode functions as an anode or cathode of a diode and the common electrode functions as the other of the cathode and anode. The pixel electrodes are separated from the common electrode by one or more layers, such as organic layers to create the OLEDs. Further, each pixel may include one or more storage capacitors which are charged by the source lines.

Typically, $V_{GH}$ and $V_{GL}$ are provided by capacitors (e.g., capacitor 440) driven by a corresponding charge pump (e.g., charge pump 410). The capacitors are coupled to a reference voltage, (e.g., system ground) and driven by the charge pump until the capacitor is able to output a predetermined voltage (e.g., $V_{GH}$ or $V_{GL}$). The charge pump continues to drive the capacitor with the current signal such that the capacitor is able to maintain an output voltage at or above the predetermined voltage. In one embodiment, $V_{GH}$ may be about 15 V and $V_{GL}$ may be −10 V. However, in other embodiments, other voltages may be used.

Figure 5:
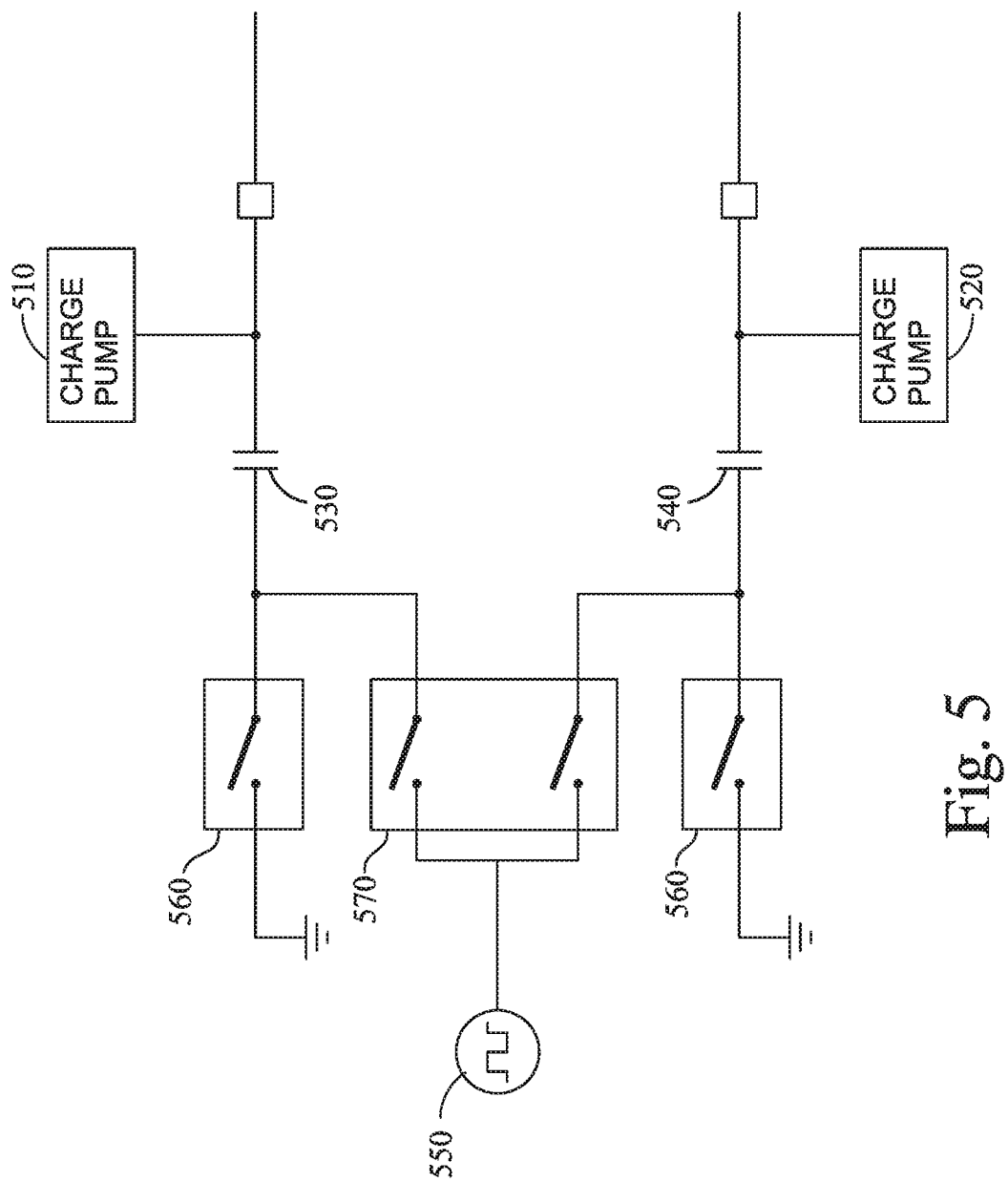
FIG. 5 illustrates an exemplary voltage modulation system in accordance with an embodiment of this disclosure.

Turning now to FIG. 5, in one embodiment, the capacitor 530 is driven by a positive charge pump 510 and the capacitor 540 is driven by a negative charge pump 520. Capacitor 530 may be configured to provide $V_{GH}$ and capacitor 540 may be configured to provide $V_{GL}$. During display updating, each charge pump (510, 520) drives a current signal onto the corresponding capacitor (530, 540), where the current signal comprises a plurality of pulses. In one embodiment, the frequency of pulses controls the amount of current that is driven onto the capacitor to charge the capacitor.

In one or more embodiments, each capacitor (530 and 540) is selectively coupled to one or more gate lines (not shown) of the display to select or de-select a plurality of pixels for updating. Capacitors 530 and 540 are also selectively coupled to a modulated signal and a substantially constant voltage via switches 570 and 560, respectively.

In one embodiment, during a display updating period, switches 560 are closed coupling one end of the capacitor to a substantially constant voltage (i.e., ground) and switches 570 are opened. During an input sensing period, the switches 560 are opened and the switches 570 are closed coupling the capacitors 530 and 540 to a modulated signal 550 (e.g., a guard signal). The guard signal may be similar in at least one of an amplitude, phase and polarity to a signal driven onto the sensor electrodes for capacitive sensing. Further, the gate lines of the display are AC coupled to the modulated signal 550 via the capacitors. In one or more embodiments, the modulated signal 550 may also be applied to the source lines of the display. The source lines may be actively driven with the guard signal or electrically floated and driven via the guard signal applied to the gate lines.

In various implementations, during an input sensing period, display updating is paused and each charge pump (510 and 520) may be tri-stated, or disconnected, such that the gate lines coupled to the output of each capacitor may be modulated with a guard signal. However, the voltage potential of capacitors 530 and 540 may decrease (droop) during the input sensing period. In various instances, when the display experiences a long delay between display update periods, the voltage potential of capacitors 530 and 540 may decrease to a level to where display updating is affected. For example, $V_{GH}$ may decrease below the "turn on" voltage for a gate line. As such, capacitor 530 may need to be recharged by charge pump 510 to provide the necessary voltage to select a gate line and corresponding pixels for updating. This may result in a delay of display updating occurring after the input sensing period. Further, display artifacts may occur when gate lines are not selected or de-selected when expected. For example, after an input sensing period, the display driver may expect to update a first gate line and provide the corresponding voltages to the source lines. However, as $V_{GH}$ may be below a gate line turn on voltage, the expected gate line may not be selected or selected for a period of time shorter than expected, and the source lines may not be able to drive the corresponding pixels to the correct voltage. $V_{GL}$ may also decrease, one or more gate lines that the display driver was expected to be de-selected may be selected (turned on) and the when the source lines are driven, pixels corresponding to those gate lines may also be driven, introducing additional display artifacts.

In one or more embodiments, capacitors 530 and 540 may be disposed within an integrated circuit reducing the cost of a corresponding system, as removing external capacitors reduces bill of material (BOM) and simplifies display module assembly. However, the maximum size of capacitors within an integrated circuit is smaller than that of capacitors external from an integrated circuit, and as such, a capacitor within an integrated circuit may store a smaller amount of charge than that of a capacitor external to an integrated circuit. In various embodiments employing integrated circuit capacitors, the charge on the capacitors may drop below $V_{GH}$ and $V_{GL}$ voltage more quickly as compared to capacitors with the ability to hold more charge. As such, the integrated circuit capacitors may have to be re-driven to update the charge on them to ensure that $V_{GH}$ and $V_{GL}$ are able to satisfy the turn-on and turn-off voltages of the display. In various embodiments, instead of using integrated circuit capacitors, the size of the external capacitors may be reduced to reduce the overall cost of the corresponding system.

As the TFTs in a display device have leakage currents, during input sensing periods when display updating is paused, the TFTs of the pixels leak current and the voltages applied to the gate lines will decrease. For example, the TFT in an LCD panel may all have a leakage current in the order of about 10 uA per panel, and the leakage current may increase as temperature of the panel increases. For example, under high temperatures, the leakage current may be about 100 uA.

The charge pump 410 is configured to provide the maximum $I_{leak}$ for a display. Maximum $I_{leak}$ occurs at high temperatures, where $I_{leak}$ high temperatures may be up to ten times greater than $I_{leak}$ at room temperature (a relatively lower temperature as compared to the high temperature). If a charge pump is configured to provide maximum $I_{leak}$ at both high and room temperatures, when operating at room temperature, an increased amount of current will be wasted. As is stated above the total current ($I_{total}$) is equal to a combination of $I_{leak}$ and $I_{reg}$ (wasted current), and as $I_{total}$ is substantially constant, as $I_{leak}$ decreases (in response to lower operating temperatures), $I_{reg}$ will increase and is essentially wasted. To minimize waste, $I_{reg}$ is bounded between an upper and lower current thresholds, and waste due to $I_{reg}$ may be minimized.

For example, when $I_{leak}$ increases, the amount of $I_{reg}$ in $I_{total}$ decreases and when the amount of $I_{reg}$ decreases below a threshold level, the charge pump is instructed to increase the amount of $I_{total}$. When $I_{leak}$ decreases, the amount of $I_{reg}$ in $I_{total}$ increases and when the amount of $I_{reg}$ increases above a threshold level, the charge pump is instructed by the charger regulator (e.g., current regulator 430) to decrease the amount of $I_{total}$. Hence, the $I_{total}$ may be adjusted to limit wasted current while providing enough leakage current for changing display panel parameters.

Figure 6:
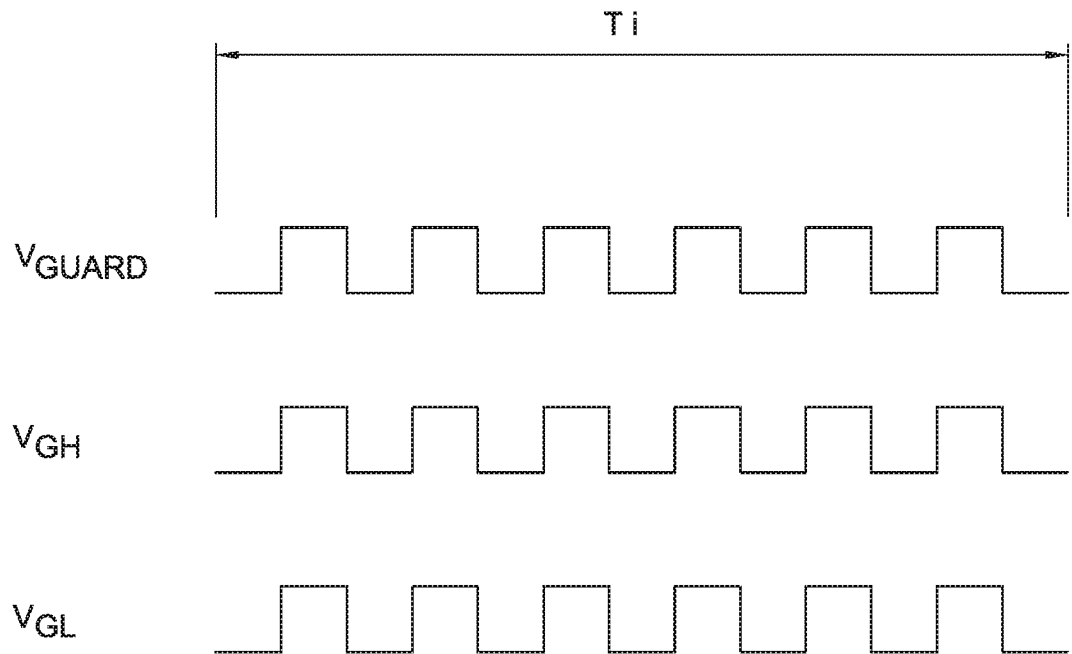
FIGS. 6 and 7 illustrate exemplary waveforms in accordance with an embodiment of this disclosure.

FIG. 6 illustrates modulation waveforms of a guard signal, modulated voltage gate high ($V_{GH}$) signals and the modulated voltage gate low ($V_{GL}$). The guard signal ($V_{GUARD}$) is applied to the $V_{GH}$ and $V_{GL}$ for a first time period, $T_i$. In one embodiment, $T_i$ may be in equal in length to a first input sensing period. In other embodiment, $T_i$ may be in equal in length to a sensing burst period. A sensing burst period comprises multiple sensing cycles, where each sensing cycle corresponds to a period of time during which there is a transition from a first voltage to a second voltage and then a transition from the second voltage to the first voltage in the sensing signal. Typically, a sensing burst comprises multiple sensing cycles.

Figure 7:
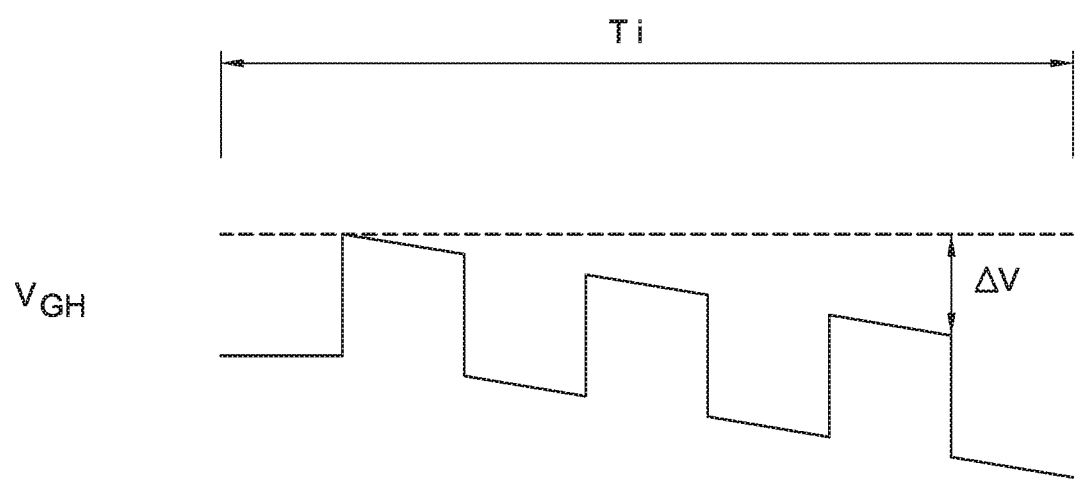

FIG. 7 illustrates a $V_{GH}$ signal experiencing a decrease in voltage during time $T_i$. As can be seen, while $V_{GH}$ experiences a consistent modulation, voltage level of $V_{GH}$ decreases by $\Delta V$. In various embodiments, $\Delta V$ corresponds to the leakage current ($I_{leak}$) of the display panel, the length of the input sensing period ($T_{sense}$) and capacitance of the corresponding capacitor ($C_{VGH}$ or $C_{VGL}$). In one specific embodiment, $$\Delta V = I_{leak} * \frac{T_{sense}}{C_{VGH}},$$

and for $T_{sense}$ of 200 us, $C_{VGH}$ of 1 nF, and $I_{leak}$ of 10 uA, $\Delta V=2$ V. Further, $V_{GL}$ experiences a similar voltage drop as is shown with $V_{GH}$.

With further reference to FIG. 4, to substantially reduce or eliminate Voltage droop, the charge pump or pumps may remain active during at least a portion of an input sensing period such that the voltage on the corresponding capacitors may be updated when it is determined to drop below a threshold level. In one embodiment, the voltage regulator 420 and the current regulator 430 function together to control the output current signal of the charge pump 410. In such embodiments, instead of tri-stating the charge pump 410 during an input sensing period, the charge pump 410 is configured to drive a current signal onto the capacitor 440 during at least a portion an input sensing period.

Figure 8:
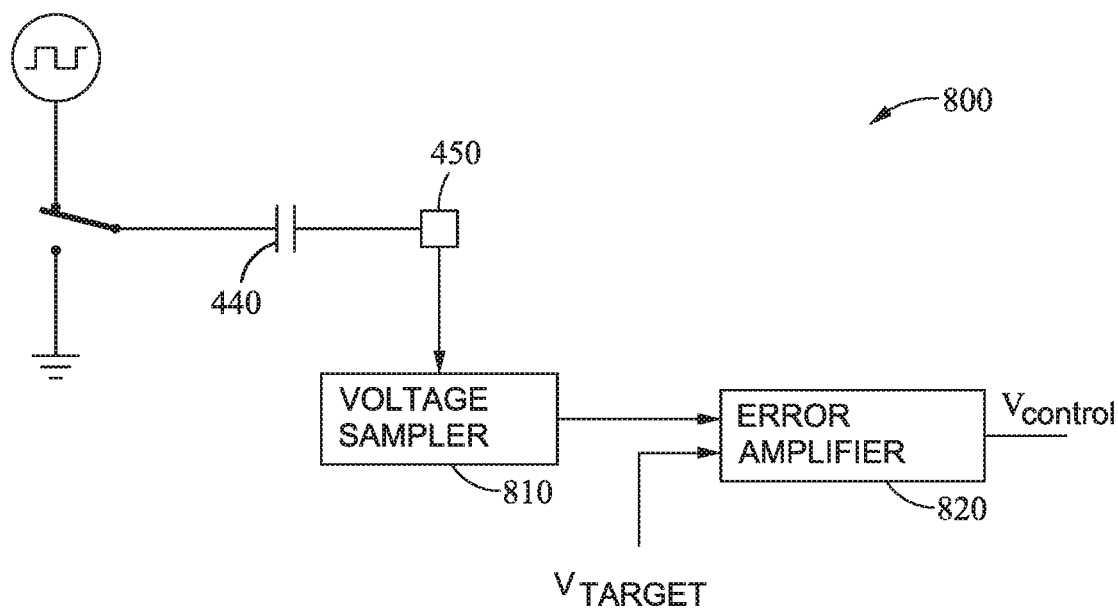
FIG. 8 is a block diagram of an exemplary voltage regulator in accordance with an embodiment of this disclosure.

FIG. 8 illustrates a voltage regulator 800 having a voltage sampler 810 and an error amplifier 820. The voltage sampler 810 receives the modulated voltage at the output of the capacitor 440 and samples the voltage. In one embodiment, the voltage regulator 800 is selectively coupled to the output of the capacitor 440. In such embodiment, one or more switches may couple voltage regulator 800 to the output of capacitor 440 during an input sensing period and decouple the voltage regulator 800 during display update periods. In other embodiments, the voltage regulator 800 is coupled to the output of capacitor 440 during both display updating periods and input sensing periods.

In one embodiment, the voltage sampler 810 is configured to sample the modulated voltage once every sensing cycle. In other embodiments, the voltage sampler 810 is configured to sample the modulated voltage at other rates, for example, the voltage sampler 810 may be configured to sample the modulated voltage once every two or more sensing cycles, multiple times during a sensing cycles, or at other time periods. In one embodiment, the rate at which the voltage sampler 810 samples the modulated voltage may be variable. For example, the rate may be based on one or more of the leakage current ($I_{leak}$) of the display, the length of the input sensing period, and a comparison of the sampled voltage to the target voltage.

The error amplifier 820 compares the sampled voltage to a target voltage, generating one or more control signals, $V_{control}$. When the sampled voltage is above the target voltage, the error amplifier 820 generates a first control signal and when the sampled voltage is below the target voltage, the error amplifier 820 generates a second control signal.

Figure 9:
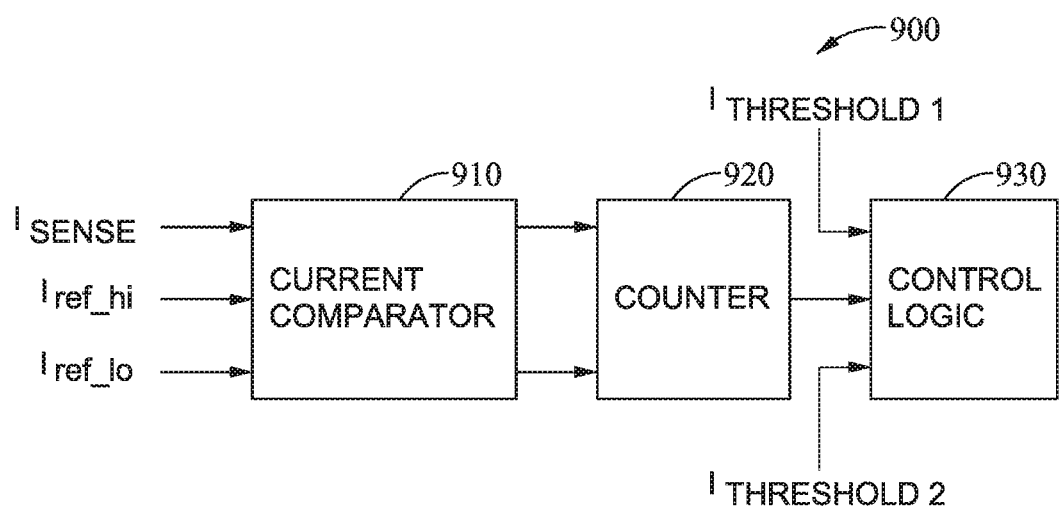
FIG. 9 is a block diagram of an exemplary current regulator in accordance with an embodiment of this disclosure.

FIG. 9 illustrates a current regulator 900 having a current comparator 910 and counter 920. In one or more embodiment, the current regulator 900 may also include control logic 930. In one embodiment, the current comparator 910 comprises a current regulator current and compares the sensed current ($I_{sense}$) to a first current threshold ($I_{ref\_hi}$) and a second current threshold ($I_{ref\_lo}$), where the first threshold is higher than the second threshold. The output of the current comparator 910 is provided to counter 920. The counter 920 is configured to increase or decrease a count value. In one embodiment, when $I_{sense}$ is greater than the first current threshold, a control signal is sent from the current comparator 910 to the counter 920, instructing the counter 920 to increase a count value. Further, when $I_{sense}$ is less than the second current threshold, a control signal is sent from the current comparator 910 to the counter 920, instructing the counter 920 to decrease the count value.

The current regulator 900 is configured to output a first control signal when the count value is determined to satisfy a first count threshold and output a second control signal when the count value is determined to satisfy a second count threshold. The count value is determined to have satisfied the first count threshold, when the count value is determined to be at least one of equal to or greater than the first count threshold. Further, the count value is determined to have satisfied the second count threshold when the count value is determined to be at least one of less than or equal to the second count threshold. In one embodiment, the first control signal includes an indication to decrease the amount of current driven by the charge pump 410 and the second control signal includes an indication to increase the a amount of current driven by the charge pump 410.

In one embodiment, the first current threshold may be about 30 µA and the second current threshold may be about 10 µA. In various embodiments, the first and second current thresholds may be determined to maintain the wasted current, $I_{reg}$, within a predetermined range or at a predetermined value.

In one embodiment, when the current regulator 900 is initiated, the count value of the counter 920 is set to a starting value. The starting value may be a midpoint between the first count threshold and the second count threshold. In one embodiment, the starting value is closer to one of the first count threshold and the second count threshold than the other. In one or more embodiments, the first and second count thresholds are variable.

The current comparator 910 may be configured to be sampled once every sensing burst period. In other embodiments, the current comparator 910 may be configured to be sampled once every two or more sensing bursts. In yet other embodiments, other rates may be used. For example, the rate may correspond to a fixed or adjustable amount of time. Further, sampling the modulated voltage may be set to a first rate and sampling the regulator current may be set to a second rate, where the first rate is greater than the second rate.

Figure 10A:
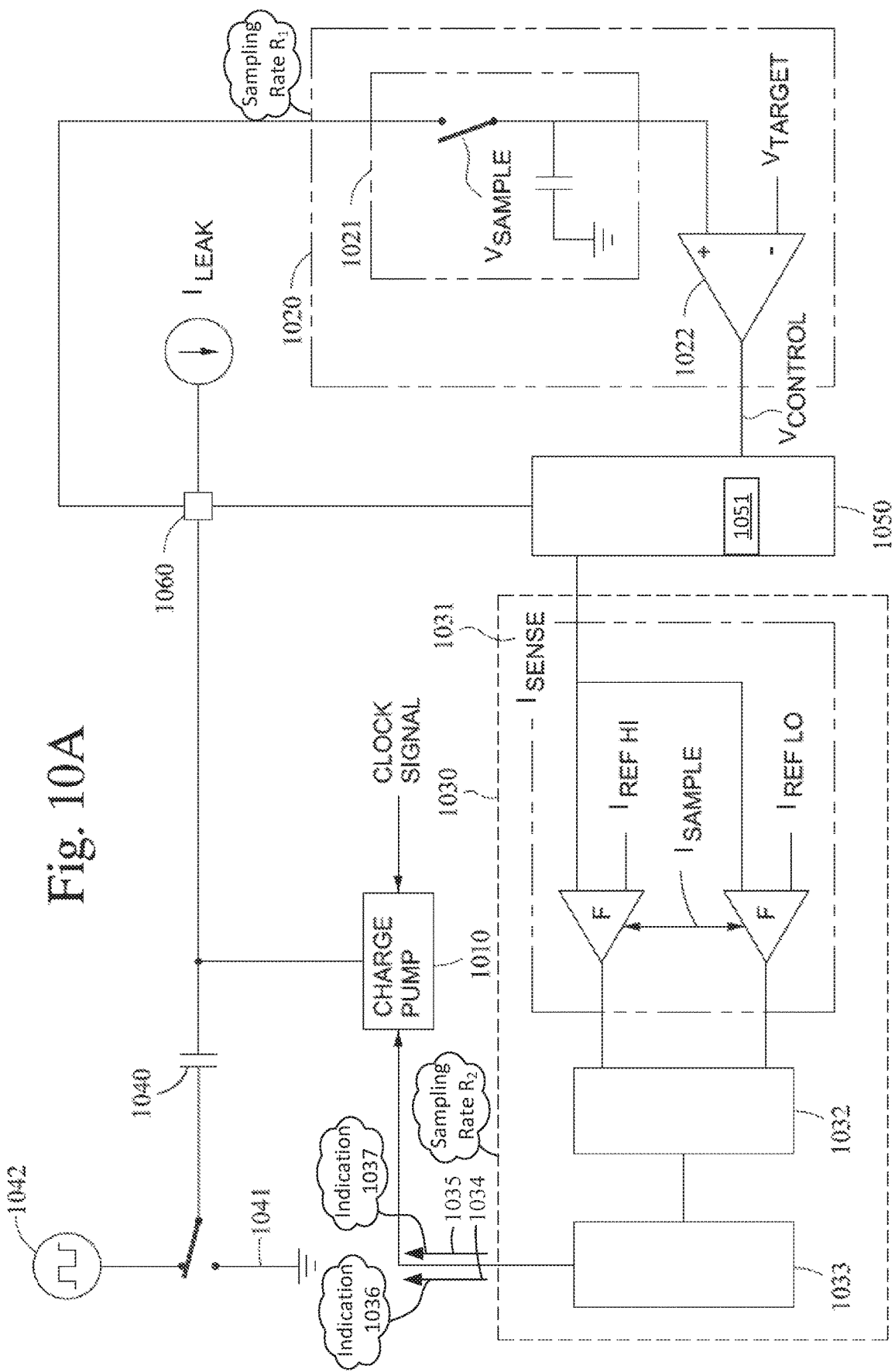
FIG. 10A illustrates an exemplary voltage regulation system in accordance with an embodiment of this disclosure.

FIG. 10A illustrates an embodiment of voltage regulation system 1000. In the illustrated embodiment, the voltage regulation system 1000 includes charge pump 1010, voltage regulator 1020, current regulator 1030 and current control circuitry 1050. The charge pump 1010 is coupled to and configured to drive a current signal onto capacitor 1040.

As is described above, in various embodiments, during an input sensing period display updating is paused and the TFTs of the display panel experience leakage (leakage current $I_{leak}$) causing the voltage on capacitor 1040 to decrease and introducing display artifacts. For example, the voltage on capacitor 1040 may decrease below expected $V_{GH}$ and $V_{GL}$ resulting in display artifacts when display updating resumes. In various embodiments, charge pump 1010 may be configured to update the charge stored within capacitor 1040 such that the output voltage does not substantially decrease (droop).

In one embodiment, the capacitor 1040 is configured to provide a gate voltage (e.g., $V_{GH}$ or $V_{GL}$) at node 1060. Further, the capacitor 1040 is selectively coupled between a reference voltage (e.g., ground or any other substantially constant voltage) and a modulated voltage 1042 (guard signal). During a display update period the capacitor 1040 is coupled to the reference voltage and provides an unmodulated gate voltage to one or gate lines coupled to node 1060. During an input sensing period, the capacitor 1040 is coupled to a modulated voltage and is configured to provide a modulated gate voltage to one or more gate lines coupled to node 1060. The modulated voltage may be a guard signal similar in at least one of amplitude and a phase of a capacitive sensing signal (e.g., the capacitive sensing signal 251 having a burst rate 253 and a sensing cycle 252) driven onto one or more capacitive sensor electrodes.

The output of the capacitor 1040 is coupled to the voltage regulator 1020 via node 1060. The voltage regulator 1020 comprises voltage sampler 1021 configured to sample the output of the capacitor 1040 and an error amplifier 1022 configured to compare the sampled voltage to a target voltage to generate an output control signal, $V_{control}$. In one embodiment, the voltage sampler 1021 samples the output of the capacitor 1040 at a first rate (e.g., sampling rate $R_1$). The first rate may be once every sensing cycle, once every two or more sensing cycles, multiple times during a sensing cycle, or any period of time. In one or more embodiments, the first rate may be adjustable.

Current control circuitry 1050 regulates current flow to the current comparator 1031 based on the control signal generated by voltage regulator 1020. In one embodiment, the error amplifier 1022 provides one or more control signal (e.g., $V_{control}$) to current control circuitry 1050 when the sampled voltage is higher than the target voltage and/or when the sampled voltage is less than the target voltage. The current control circuitry 1050 regulates current flowing through to current regulator 1030, controlling regulator current ($I_{reg}$) provided to current regulator 1030 in response to receiving the control signal. $I_{reg}$ is based on the amount of $I_{leak}$ in $I_{total}$ provided by a charge pump.

In one embodiment, the current control circuitry 1050 comprises a transistor (e.g., a transistor 1051) having a gate coupled to the output of the error amplifier 1022. When error amplifier 1022 determines that $V_{sample}$ is less than $V_{target}$, the output of error amplifier 1022 initiates a flow of $I_{reg}$ via the transistor of the current control circuitry 1050.

The current regulator 1030 senses $I_{reg}$ and compares the sensed current, $I_{sense}$, to a high current threshold ($I_{ref\_hi}$) and a low current threshold ($I_{ref\_lo}$). The current regulator 1030 may be configured to sample the $I_{reg}$ at a second rate (e.g., the sampling rate $R_2$) different than the rate at which voltage sampler 1021 samples the modulated voltage (first rate). In one embodiment, the second rate is less than the first rate. Stated another way, the voltage may be sampled more often than the current is sampled. For example, the second rate may be once every sensing burst, where a sensing burst comprises more than one sensing cycle. Further, the second rate may be once every two or more sensing bursts. In other embodiments, the second rate may be multiple times during a sensing burst such that the second rate is less than the first rate. As illustrated in FIG. 10A, $I_{sample}$ is the enabling signal for the current comparator latch.

$I_{sense}$ is compared to $I_{ref\_hi}$ and $I_{ref\_lo}$, where $I_{ref\_hi}$ threshold is greater than $I_{ref\_lo}$ by current comparator 1031. The thresholds may be based on one or more current levels of the input device. For example, the threshold may be based on a leakage current or currents of the display device. In one embodiment, the thresholds may be fixed values or they may be adjustable.

When the sensed current is determined to be greater than $I_{ref\_hi}$, a first control signal is sent to a counter 1032 and when the sensed current is determined to be less than $I_{ref\_lo}$, a second control signal is sent to the counter 1032. The counter 1032 increases a count value based on the first control signal and decreases the count value based on the second control signal.

The current comparator 1031 is configured to provide a current control signal to the charge pump 1010 based on the count value. In one embodiment, current comparator 1031 provides a current control (e.g., a current control signal 1034) signal providing an indication (e.g., an indication 1036) to increase the current output by the charge pump 1010 when the count value exceeds a first count value threshold ($I_{THRESHOLD1}$). Further, the current regulator 1030 provides a current control signal (e.g., a current control signal 1035) providing an indication (e.g., an indication 1037) to decrease the current output by the charge pump 1010 when the count value drops below a second count value ($I_{THRESHOLD2}$).

In one embodiment, the current comparator 1031 comprises logic to determine when to provide a current control signal to indicate an increase in current and when to provide a current control signal to indicate a decrease in current.

In one embodiment, the charge pump 1010 outputs a pulsed current signal. In such an embodiment, the current control signal provides an indication to adjust the frequency of the pulses within the current signal. For example, the current control signal may provide an indication to increase the number of pulses within the pulsed current signal to increase the output current. Further, the current control signal may provide an indication to decrease the number of pulses within the pulsed current signal to decrease the output current. In other embodiments, the current control signal provides an indication to increase or decrease the value of the flying capacitor or capacitors within the charge pump 1010, increase or decrease current within the current signal.

Figure 10B:
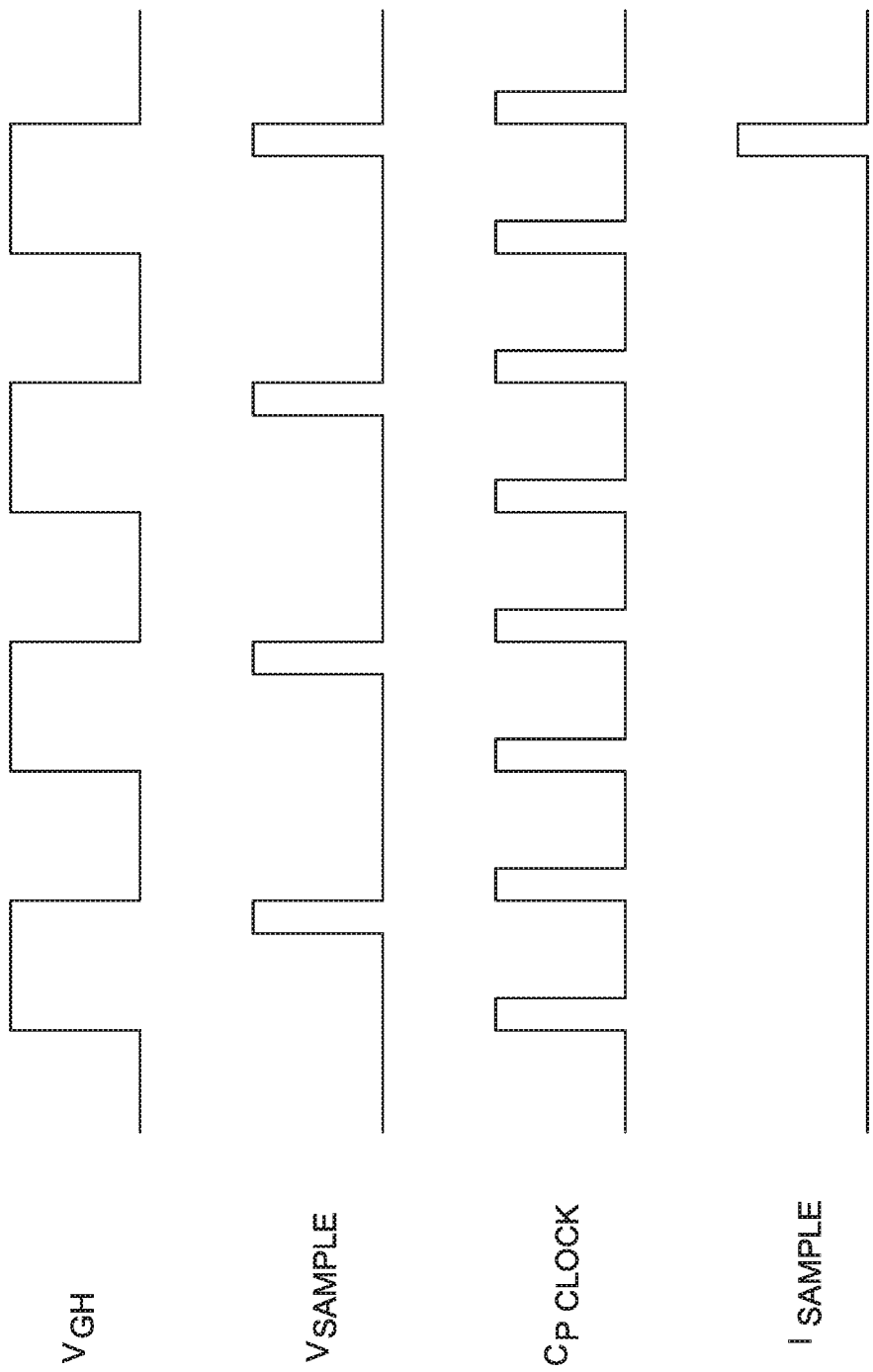
FIG. 10B illustrates exemplary waveforms in accordance with an embodiment of this disclosure.

FIG. 10B illustrates the charge pump clock signal ($CP_{clock}$), modulated $V_{GH}$, $V_{sample}$ and $I_{sample}$. In the illustrated embodiment, $V_{sample}$ occurs once each sensing burst while $I_{sample}$ occurs once every multiple sensing bursts. In one or more embodiments, $CP_{clock}$ is clocked at multiples of the frequency of the capacitive sensing signal used for capacitive sensing. In other embodiments, $CP_{clock}$ is clocked at orders of the frequency of the capacitive sensing signal.

Figure 11:
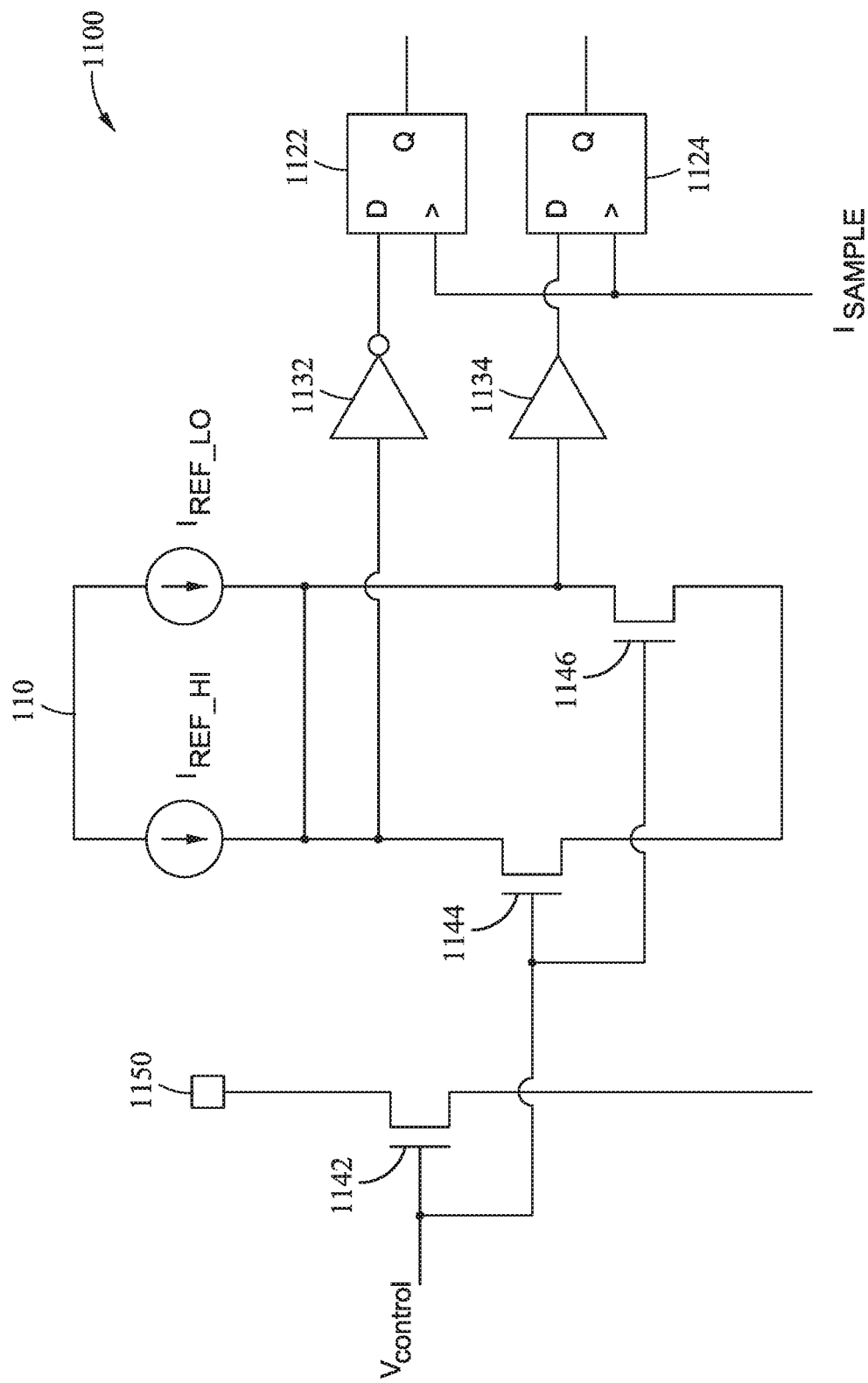
FIG. 11 illustrates an exemplary current comparator in accordance with an embodiment of this disclosure.

FIG. 11 illustrates an example current sensing and comparison circuit 1100. As illustrated, the current sensing and comparison circuit 1100 includes current sources 1110 for both $I_{ref\_hi}$ and $I_{ref\_lo}$ which are controlled by the output of voltage regulator 1020 through transistors 1141, 1144 and 1146. Flow of current $I_{ref\_hi}$ is controlled via transistor 1144 and flow $I_{ref\_lo}$ is controlled via transistor 1146. Further, the current sensing and comparison circuit 1100 may include a first and second latch (1122 and 1224) configured to compare $I_{sense}$ to $I_{ref\_hi}$ and $I_{ref\_lo}$ via inverter 1132 and buffer 1134, respectively, and output a respective control signal to a counter (e.g., counter 920, 1032). In one embodiment, the first latch 1122 outputs a first control signal to the counter (e.g., counter 920, 1032) and the second latch 1124 outputs a second control signal to the counter (e.g., counter 920, 1032).

Figure 12:
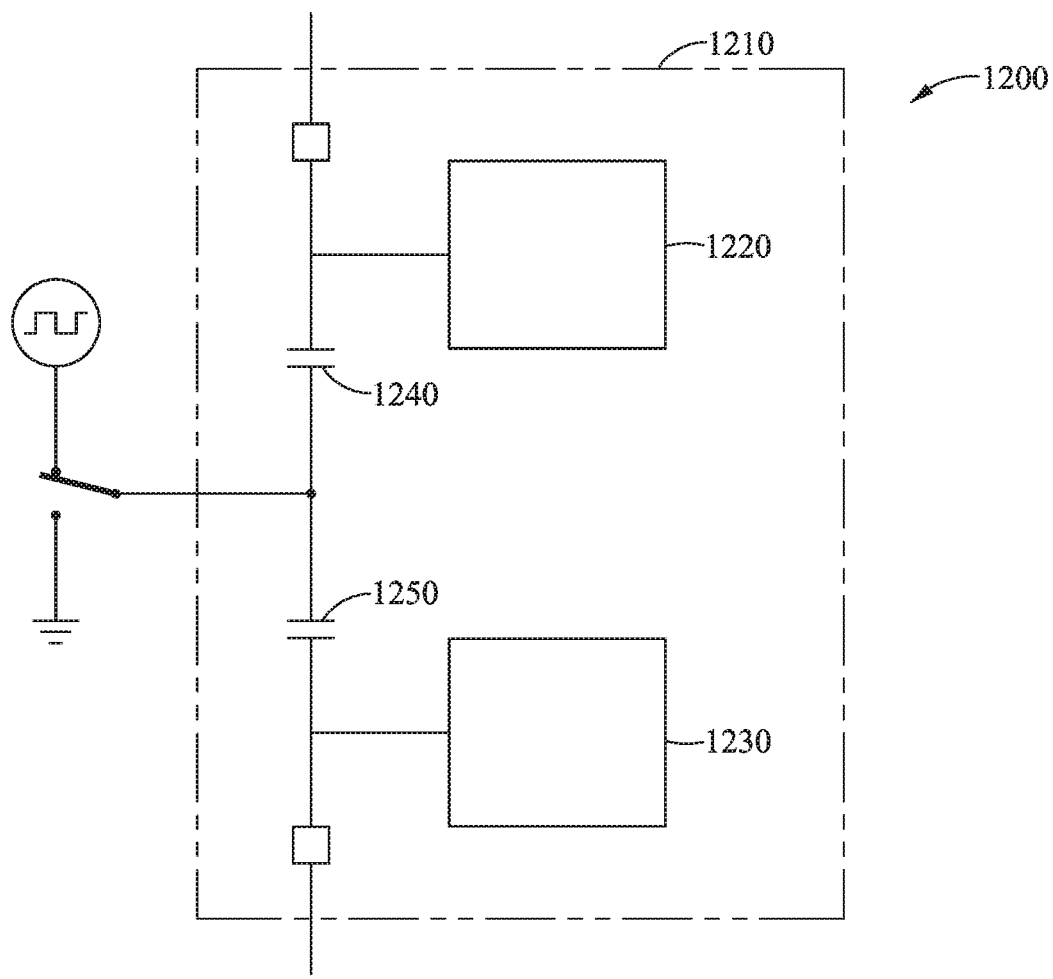
FIG. 12 is a block diagram of an exemplary display driver in accordance with an embodiment of this disclosure.

The voltage regulation system may be included within the integrated circuit of a display driver. The embodiment of FIG. 12 illustrates a processing system 1200 having voltage regulation system 1220 and voltage regulation system 1230. In one embodiment, voltage regulation system 1220 is coupled to a $V_{GH}$ capacitor 1240 and voltage regulation system 1230 is coupled to a $V_{GL}$ capacitor 1250. The $V_{GH}$ capacitor 1240 and $V_{GL}$ capacitor 1250 may be selectively coupled to a substantially constant voltage and a modulated voltage. For example, the $V_{GH}$ capacitor 1240 and $V_{GL}$ capacitor 1250 may be coupled to the substantially constant voltage during a display update period and coupled to the modulated voltage during an input sensing period.

In one embodiment, the processing system 1210 comprises a display driver configured to be coupled to gate lines and/or source lines of a display device. In one or more embodiments, the processing system 1210 comprises a display driver configured to be coupled to gate lines and/or source lines of a display device and a sensor driver configured to be coupled to one or more sensor electrodes.

The $V_{GH}$ capacitor 1240 and $V_{GL}$ capacitor 1250 may be disposed within the same integrated circuit as voltage regulation system 1220 and voltage regulation system 1230. Further, $V_{GH}$ capacitor 1240 and $V_{GL}$ capacitor 1250 may be configured to be selectively coupled to gate lines of a display. For example, $V_{GH}$ capacitor 1240 may be selectively coupled to a first gate line or lines to provide a turn on to the first gate line or lines. Further, the $V_{GL}$ capacitor 1250 may be selectively coupled to a second gate line or lines to provide a turn off voltage for the pixels coupled to those gate lines.

Figure 13:
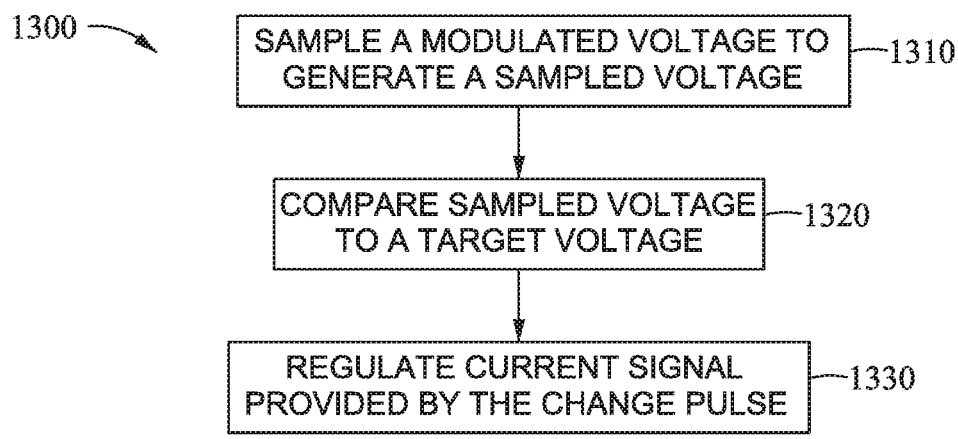
FIG. 13 is a flowchart illustrating a method of regulating a gate voltage of a display device in accordance with an embodiment of this disclosure.

FIG. 13 illustrates a flowchart 1300 illustrating a method for regulating a voltage for a display driver. At step 1310, the method includes sampling a modulated voltage to generate a sampled voltage. The output of a capacitor is modulated to produce the modulated voltage and the capacitor is driven by a current signal of a charge pump. At step 1320, the sampled voltage is compared to a target voltage to determine if the sampled voltage is greater than or less than the target voltage. At step 1330, the current signal is regulated based on a determination that the sampled voltage is less than the target voltage.

In one embodiment, regulating the current signal includes providing an indication to increase the current signal and providing an indication to decrease the current signal based on a comparison of a sampled current to threshold current values. For example, regulating the current signal may include comparing a sample of a portion of the current signal to a first threshold value and a second threshold value, the first threshold value being greater than the second threshold value. Further, a count value may be increased when the first threshold value is satisfied and the count value may be decreased when the second threshold value is satisfied. A first indication to increase current of the current signal is provided when a first count threshold is satisfied by the count value and a second indication to decrease the current of the current signal when a second count threshold is satisfied by the count value.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A voltage regulation system comprising:
a charge pump configured to output a current signal to a capacitor, wherein the capacitor is modulated producing a modulated voltage signal;
a voltage regulator coupled to an output of the capacitor and configured:
to sample the modulated voltage signal generating a sampled voltage,
compare the sampled voltage to a target voltage, and
generate a first control signal based on the comparison; and
a current regulator coupled to the voltage regulator and the charge pump and configured to sample at least a portion of the current signal and regulate the current signal based at least in part on the first control signal, wherein the current regulator comprises:
a current comparator configured to compare the sampled current to a first threshold value and a second threshold value, wherein the first threshold value is greater than the second threshold value; and
a counter configured to increase a count value when the sampled current satisfies the first threshold value and decrease the count value when the sampled current satisfies the second threshold value,
wherein the current regulator is configured to output a current control signal indicating an increase of current of the current signal when the count value satisfies a first count threshold and a second current control signal indicating a decrease of the current of the current signal when the count value satisfies a second count threshold.

2. The voltage regulation system of claim 1, wherein the voltage regulator comprises a sampler configured to sample the modulated voltage signal and an error amplifier configured to compare the sampled voltage to the target voltage.

3. The voltage regulation system of claim 1, wherein regulating the current signal comprises one of providing an indication to increase current of the current signal and providing an indication to decrease the current of the current signal.

4. The voltage regulation system of claim 1, wherein the voltage regulator is configured to sample the modulated voltage signal at a first rate and the current regulator is configured to sample the current signal at a second rate, wherein the first rate is greater than the second rate.

5. The voltage regulation system of claim 1, wherein the modulated voltage signal corresponds to a capacitive sensing signal driven onto a one or more sensing electrodes for capacitive sensing, and wherein the voltage regulator is configured to sample the modulated voltage signal at a first rate and the current regulator is configured to sample the current signal at a second rate, wherein the first rate is based on a sensing cycle rate of the capacitive sensing signal and the second rate is based on a burst rate of the capacitive sensing signal.

6. The voltage regulation system of claim 2 further comprises a current control circuitry coupled between the voltage regulator and the current regulator, wherein the current control circuitry is configured to control a regulation current of the current regulator.

7. The voltage regulation system of claim 6, wherein when said sampled voltage is less than the target voltage the current control circuitry initiates the regulation current.

8. The voltage regulation system of claim 6, wherein the current control circuitry comprises a transistor.

9. A display driver for a display device comprising:
a capacitor configured to be coupled to at least one gate line of the display device, wherein the capacitor is modulated outputting a modulated voltage signal; and
a voltage regulation system coupled the output of the capacitor, the voltage regulation system comprising:
a charge pump configured to output a current signal to the capacitor;
a voltage regulator configured to:
sample the modulated voltage signal at a first rate generating a sampled voltage, compare the sampled voltage to a target voltage and
generate a first control signal based on the comparison; and
a current regulator coupled to the voltage regulator and the charge pump and configured to:
sample the current signal at a second rate, wherein the first rate differs from the second rate; and
regulate the current signal based at least in part on the first control signal.

10. The display driver of claim 9, wherein the voltage regulator comprises a sampler configured to sample the modulated voltage signal and an error amplifier configured to compare the sampled voltage to the target voltage.

11. The display driver of claim 9, wherein the voltage regulation system further comprises a control mechanism coupled between the voltage regulator and the current regulator, wherein the control mechanism is configured to control a regulation current of the current regulator.

12. The display driver of claim 9, wherein regulating the current signal comprises one of providing an indication to increase current of the current signal and providing an indication to decrease the current of the current signal provided by the charge pump.

13. The display driver of claim 9, wherein the current regulator configured to sample at least a portion of the current signal and comprises:
a current comparator configured to compare the sampled current to a first threshold value and a second threshold value, wherein the first threshold value is greater than the second threshold value; and
a counter configured to increase a count value when t the sampled current satisfies the first threshold value and decrease the count value when the sampled current satisfies the second threshold value,
wherein the current regulator is configured to output a current control signal indicating an increase of current of the current signal when the count value satisfies a first count threshold and a second current control signal indicating a decrease of the current of the current signal when the count value satisfies a second count threshold.

14. The display driver of claim 9, wherein the modulated voltage signal corresponds to a modulated sensing signal driven by a sensor driver onto a one or more sensing electrodes for capacitive sensing.

15. A method for regulating a voltage for a display driver, said method comprises:

sampling a modulated voltage signal at a first rate to generate a sampled voltage, wherein the modulated voltage signal corresponds to a capacitive sensing signal driven onto one or more sensing electrodes for capacitive sensing, wherein the first rate is based on a sensing cycle rate of the capacitive sensing signal, wherein an output of a capacitor is modulated to produce the modulated voltage signal and wherein the capacitor is driven by a current signal of a charge pump;

comparing the sampled voltage to a target voltage to determine if the sampled voltage is one of greater than and less than the target voltage;

sampling the current signal at a second rate, wherein the second rate is based on a burst rate of the capacitive sensing signal; and regulating the current signal based on a determination that the sampled voltage is less than the target voltage.

16. The method of claim 15, wherein regulating the current signal comprises one of providing an indication to increase current of the current signal and providing an indication to decrease the current of the current signal.

17. The method of claim 15 wherein regulating the current signal comprises:

comparing a sample of a portion of the current signal to a first threshold value and a second threshold value, wherein the first threshold value is greater than the second threshold value;

increasing a count value when the sampled current satisfies the first threshold value;

decreasing the count value when the sampled current satisfies the second threshold value; and providing a first indication indicating an increase of current of the current signal when the count value satisfies a first count threshold and a second indication indicating a decrease of the current of the current signal when the count value satisfies a second count threshold.

18. The method of claim 15, further comprising sampling the modulated voltage signal at a first rate and the sampling the current signal at a second rate, wherein the first rate is greater than the second rate.

* * * * *

UNITED STATES PATENT AND TRADEMARK OFFICE
CERTIFICATE OF CORRECTION

PATENT NO. : 10,503,311 B2  
APPLICATION NO. : 15/865785  
DATED : December 10, 2019  
INVENTOR(S) : Chunbo Liu et al.

It is certified that error appears in the above-identified patent and that said Letters Patent is hereby corrected as shown below:

In the Claims

In Column 20, Line 15, In Claim 9, after "coupled" insert -- to --.

In Column 20, Line 52, In Claim 13, after "when" delete "t".

Signed and Sealed this  
Twenty-fourth Day of November, 2020

Andrei Iancu  
*Director of the United States Patent and Trademark Office*